United States Patent [19]

DiPaola

[11] 4,220,294
[45] Sep. 2, 1980

[54] SAFETY BELT RETRACTOR

[75] Inventor: Donald A. DiPaola, Mt. Clemens, Mich.

[73] Assignee: Allied Chemical Corporation, Morris Township, Morris County, N.J.

[21] Appl. No.: 13,708

[22] Filed: Feb. 21, 1979

[51] Int. Cl.³ .................... A62B 35/02; B65H 75/48
[52] U.S. Cl. ............................. 242/107.4 A; 74/576
[58] Field of Search ............... 242/107.4 R, 107.4 E; 74/576; 297/388; 280/806, 807

[56] References Cited

U.S. PATENT DOCUMENTS

| | | | |
|---|---|---|---|
| 3,540,306 | 11/1970 | Nurmse | 74/576 |
| 3,831,878 | 8/1974 | Griffin | 242/107.4 A |
| 4,084,840 | 4/1978 | Buff et al. | 242/107.4 A X |
| 4,099,685 | 7/1978 | Paitula | 242/107.4 A X |

Primary Examiner—John M. Jillions
Attorney, Agent, or Firm—Roger H. Criss

[57] ABSTRACT

An improved safety belt retractor comprising a ratchet means, a locking means which is engageable with the ratchet means, and an actuating means which is actuable in response to a predetermined acceleration for engaging the locking means with the ratchet means, wherein the improvement comprises a flexible means for spacing the locking means from the ratchet means and for allowing the locking means to engage the ratchet means upon actuation of the actuating means. The spacing means eliminates the rattling noise caused by the metal-to-metal contact between the locking means and the ratchet means, but the spacing means, being flexible, permits the locking means to engage the ratchet means upon actuation of the actuating means.

9 Claims, 2 Drawing Figures

SAFETY BELT RETRACTOR

BACKGROUND OF THE INVENTION

1. Field of the Invention

This invention relates to improved safety belt retractors for occupants of vehicles, such as automobiles. More particularly, this invention relates to improved safety belt retractors which are responsive to acceleration, deceleration or change in orientation of the vehicle, such as during cornering or braking. It is intended that the term "acceleration" as used hereinafter include the effect produced by acceleration, deceleration or change in orientation of the vehicle.

2. Description of the Prior Art

Vehicle sensitive safety belt retractors that are responsive to acceleration of the vehicle for preventing protraction of the belt upon a predetermined acceleration of the vehicle are well known. Hereinafter such predetermined acceleration is referred to as lockup acceleration. The metallic locking means (pawl) of such retractors is moved by an actuating mechanism that is responsive to abrupt vehicle acceleration. The actuating mechanism moves the pawl from an unlocked position to a locked position, in which the pawl is engaged with the metallic ratchet teeth of the ratchet means to prevent protraction of the belt. In certain of these types of retractors, the pawl is gravity biased to its unlocked position and will thus move towards its locked position upon being subjected to vertical acceleration, such as that encountered when a vehicle is traveling over a rough road. The pawl also moves towards locked position when subjected to vertical acceleration in combination with partial actuation by the actuating mechanism. The partial actuation is caused when the actuating mechanism is subjected to horizontal acceleration which is less than lockup acceleration. The movement of the pawl towards locked position causes metal-to-metal contact between the pawl and the ratchet teeth, thus resulting in unwanted rattling noise.

Several methods have been developed to reduce the rattling noise caused by the metal-to-metal contact of the pawl and ratchet teeth. A common form of noise mitigation consists of the placement of flock on the pawl to reduce the sound produced when the pawl contacts the ratchet teeth. Another method of noise reduction is disclosed in Griffin, U.S. Pat. No. 3,831,878, wherein plastic disks that are carried by the retractor belt reel alongside of the end plates of the reel are employed to prevent metal-to-metal contact between the pawl and the circumferential connecting surfaces of the ratchet teeth. However, the disks do not prevent metal-to-metal contact between the pawl and the inside of the ratchet teeth, i.e., the slotted or notched portion of the ratchet means that forms the ratchet teeth. Moreover, such disks may shift and consequently interfere with the engagement of the pawl with the ratchet means during emergency lockup conditions.

Vertical acceleration caused by rough road conditions results in additional rattling noise. Some of the additional rattling noise is produced by vibration of the pawl within the support means, since the ends of the pawl are movably disposed in slots in the support means. The pawl generates additional rattling noise when it returns to its rest position in contact with the actuating mechanism after moving vertically in response to the vertical acceleration. Similarly, noise is generated by the actuating mechanism when it returns to its rest position against the support means on which it is supported or suspended after moving vertically in response to the vertical acceleration. Neither the placement of flock on the pawl nor the use of notched disks as in Griffin mitigates any of these additional rattling noises.

BRIEF SUMMARY OF THE INVENTION

In accordance with this invention, there is provided an improved safety belt retractor comprising a ratchet means, a locking means which is engageable with the ratchet means, and an actuating means which is actuable in response to a predetermined acceleration for engaging the locking means with the ratchet means, wherein the improvement comprises a flexible means for spacing the locking means from the ratchet means and for allowing the locking means to engage the ratchet means upon actuation of the actuating means.

The flexible spacing means prevents metal-to-metal contact between the locking means and the ratchet means, which is caused by vertical acceleration or vertical acceleration in combination with partial actuation by the actuating means. By preventing the metal-to-metal contact, the spacing means eliminates the rattling noise occasioned in vehicle sensitive safety belt retractors, such as retractors in which the pawl is gravity biased to its unlocked position. At the same time, the spacing means, being flexible, permits the locking means to move into engagement with the ratchet means upon actuation of the actuating means.

Vertical acceleration may occur when the vehicle in which the retractor is installed is traveling over a rough road. The partial actuation by the actuating means may occur when the actuating means is subjected to horizontal acceleration which is less than lockup acceleration, such as during sudden acceleration of the vehicle or engagement of the brakes.

Additional noise reduction can be achieved by extending the spacing means so that the spacing means is in contact with the pawl when the pawl is in its rest position, i.e., unlocked position. Such embodiments eliminates the rattling noise caused by contact between the pawl and the support means of the retractor, the pawl and the actuating means, and the actuating means and the support means.

The flexible spacing means may take various embodiments such as a flexible disk or a body having a plurality of flexible elements extending radially therefrom. In the preferred embodiment of the invention, which will subsequently be disclosed in detail, the body takes the form of a disk and the flexible elements take the form of filaments.

Other objectives, advantages and applications of the present invention will be made apparent by the following detailed description of the preferred embodiment of the invention.

DETAILED DESCRIPTION OF THE PREFERRED EMBODIMENT

The retractor described herein is illustrative to one form of a vehicle sensitive safety belt retractor incorporating the flexible spacing means of the present invention. Other forms of the retractor can also be used; therefore, the retractor described should be interpreted as exemplary and not in a limiting sense.

Figure 1:
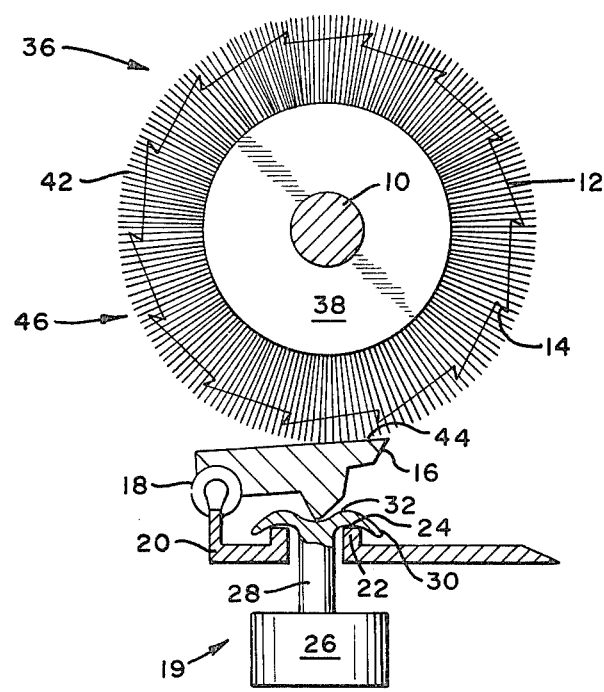
FIG. 1 is an elevational view of the improved safety belt retractor of the present invention which incorporates the preferred embodiment of the flexible spacing means.

A conventional retractor has a reel means connected to a shaft (e.g., shaft 10 in FIG. 1) rotatably mounted in a support means. The support means is a load bearing member and is provided with a mounting means in the form of a rigid extension adapted to be bolted or otherwise secured to an anchorage point on the vehicle. A belt means, formed of a flexible nylon web or the like, is attached to the reel means for protraction and retraction with respect thereto. The reel means is provided with a biasing means, such as a torsion return spring or the like, for biasing in a conventional manner the reel means in a retraction direction. Referring to FIG. 1, fixedly mounted on the reel means (not shown) for rotation therewith is one or more, preferably two, ratchet means 12, the periphery of which has a plurality of circumferentially spaced ratchet teeth 14 formed by closely spaced notches or slots. Ratchet means 12 may be directly mounted on the reel means. However, the definition of "ratchet means" herein is also intended to include structure, including ratchet teeth, connected to but not directly mounted on the reel means.

A locking means 16 is mounted on a pivot 18 journaled on the support means for engaging ratchet means 12 to stop rotation of the reel means, thereby preventing further protraction of the seat belt. Locking means 16 is moved into engagement with ratchet means 12 by an actuating means, shown generally at 19, which is responsive to acceleration of the vehicle. Each of the reel means, support means, mounting means, ratchet means 12 and locking means 16 is generally constructed of a suitable metal, such as heat treated steel or the like.

Actuating means 19 may include a mounting means comprising an arm 20 for attachment to the support means. Arm 20 is provided, for example, with an open-ended upwardly extending projection 22, having its top 24 substantially parallel to the floor of the vehicle. Arm 20 and projection 22 can consist of two separate elements or a unitary member formed, for example, of plastic. Actuating means 19 further includes a pendulum means comprising a pendulum weight 26 on the lower end of a shaft 28 connected at its upper end to a cap 30. Shaft 28 extends through open-ended projection 22 in a substantially vertical direction so that the upper surface 32 of cap 30 contacts locking means 16 and the lower surface of cap 30 is supported by the top 24 of projection 22. The "actuating means" described herein is merely illustrative and should not be taken in a limiting sense. Other forms of the actuating means, for example, a pendulum means suspended from a ball and socket type mount, can also be used.

Flexible spacing means 36 is mounted on shaft 10 adjacent to ratchet means 12. Only one spacing means 36 is illustrated in FIG. 1; however, two or more may be employed, such as one spacing means 36 mounted on each end of shaft 10 adjacent to each ratchet means 12. The length of filaments 42 is such that when disk 38 is mounted on shaft 10, filaments 42 extend beyond ratchet teeth 14 and contact face 44 of locking means 16. Filaments 42 may be lengthened so that they are slightly curved at the point of contact with face 44, thus providing maximum motion damping of locking means 16. If desired, but not preferred, filaments 42 may extend beyond ratchet teeth 14, but not contact face 44.

Figure 2:
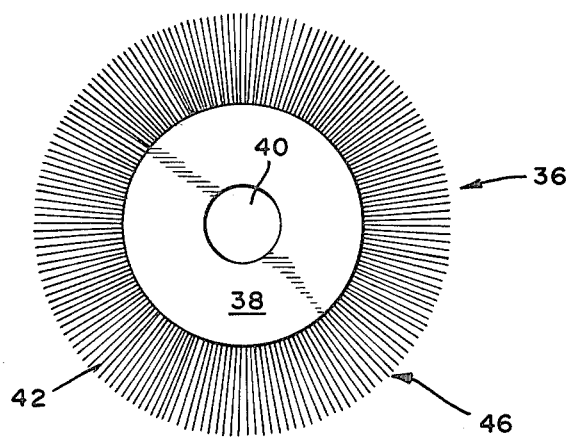
FIG. 2 is an elevational view of the preferred embodiment of the flexible spacing means prior to incorporation into the safety belt retractor.

FIG. 2 shows the preferred embodiment of flexible spacing means 36. In this embodiment spacing means 36 comprises a disk 38, which has a central aperture 40 suitable for mounting on shaft 10 (FIG. 1), and filaments 42. Filaments 42 are attached to disk 38, such that they extend radially out from disk 38 and are spaced from one another. Disk 38 can be made of plastic, e.g., nylon, or other suitable material. Filaments 42 may be constructed of any flexible material, such as nylon or polyester.

When the vehicle is not in motion, the pendulum means of actuating means 18 remains freely suspended from the mounting means in a vertical position, with the result that the lower surface of cap 30 contacts and is supported by arm 20. Locking means 16 rests on upper surface 32 of cap 30 and does not engage ratchet means 12. Ends 46 of filaments 42 contact face 44 of locking means 16. Acceleration of the vehicle above a preselected magnitude, i.e., lockup acceleration, causes the pendulum means to be displaced from the substantially vertical position. Cap 30 pivots with the result that upper surface 32 of cap 30 rises in a substantially vertical direction and moves locking means 16 towards engagement with ratchet teeth 14, thus causing filaments 42 to bend because of their flexible nature. The bending of filaments 42 allows locking means 16 to engage with ratchet teeth 14 of ratchet means 12, without interference. The engagement of locking means 16 with ratchet teeth 14 prevents further protraction of the belt means. Upon the termination of the lockup acceleration, locking means 16 disengages from ratchet teeth 14, and filaments 42 return to their original position, thus again spacing locking means 16 from ratchet teeth 20 until actuating means 18 is subjected to lockup acceleration.

When locking means 16 is subjected to vertical acceleration such as that encountered when a vehicle is traveling over a rough road, the vertical acceleration causes locking means 16 to move towards engagement with ratchet teeth 14. Filaments 42 prevent contact between locking means 16 and ratchet teeth 14, unless the force exerted by face 44 on ends 46 as a result of the vertical acceleration is equal to or greater than the force that is exerted thereon during lockup acceleration. Because filaments 42 damp the motion of locking means 16 in response to vertical acceleration, the rattling noise generated between locking means 16 and the support means (not shown), locking means 16 and upper surface 32, and the lower surface of cap 30 and top 22 is reduced.

Under certain conditions locking means 16 may be moved towards engagement with ratchet teeth 14 by a combination of partial actuation by actuating means 24, caused by horizontal acceleration, which is less than lockup acceleration, and vertical acceleration, which is caused by a bumpy road. As described above, spacing means 36 will prevent metal-to-metal contact of locking means 16 and ratchet teeth 14 provided that the force exerted by face 44 on filaments 42 is less than the force that would be exerted thereon during lockup acceleration.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. An improved safety belt retractor comprising a ratchet means, a movable locking means which is engageable with said ratchet means, and an actuating means which is actuable in response to a predetermined acceleration for engaging said locking means with said ratchet means, wherein the improvement comprises:

spacing means normally preventing said locking means from engaging with said ratchet means, said spacing means comprising a plurality of spaced apart, flexible elements, which are bendable upon contact by said locking means in response to actuation of said actuating means to permit said locking means to move between adjacent flexible elements and into engagement with said ratchet means.

2. A safety belt retractor as recited in claim 1 wherein said flexible elements are filaments.

3. A safety belt retractor as recited in claim 1, wherein said flexible elements are in contact with said locking means when said locking means is in its non-engaged position.

4. A safety belt retractor as recited in claim 1, wherein said spacing means comprises a body having said plurality of flexible elements extending radially therefrom.

5. A safety belt retractor as recited in claim 4, wherein said body is a disk and said plurality of flexible elements are filaments.

6. A safety belt retractor as recited in claim 5, further comprising a shaft, wherein said ratchet means comprises a ratchet wheel having a plurality of circumferentially spaced ratchet teeth, said ratchet means is connected to said shaft, and said disk has a central aperture and is mounted on said shaft adjacent said ratchet wheel.

7. A safety belt retractor as recited in claim 6, wherein said flexible filaments extend radially beyond the circumference of said ratchet wheel.

8. A safety belt retractor as recited in claim 7, wherein said filaments are in contact with said locking means when said locking means is in its non-engaged position.

9. A safety belt retractor as recited in claim 8 wherein said actuating means comprises a pendulum member and said locking means comprises a pawl which is movable in response to movement of said pendulum member.

* * * * *